Patented Mar. 9, 1943

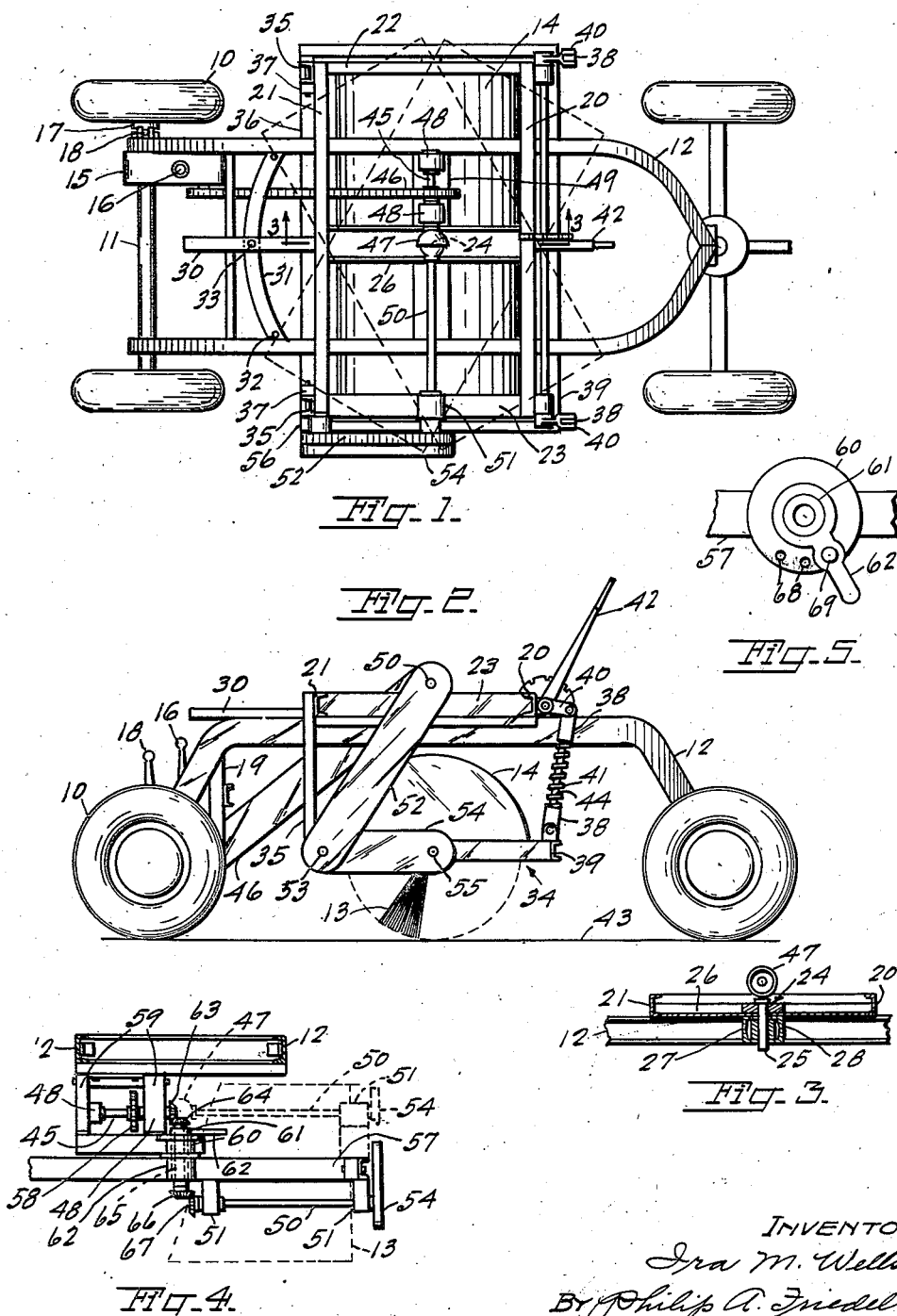

2,313,412

UNITED STATES PATENT OFFICE 2,313,412

REVERSIBLE TRACTION BROOM

Ira M. Wells, Oakland, Calif., assignor to The Spears-Wells Machinery Co., Inc., Oakland, Calif., a corporation of California Application December 26, 1941, Serial No. 424,478

1 Claim. (Cl. 15—82)

This invention is an improvement over my existing Patent 2,238,716, issued April 15, 1941, and is intended to provide a traction broom which, like that of the previous patent, may be adjusted angularly to sweep diagonally of the path of travel, and which additionally provides a driving connection between the traction driving member and the broom in which no extensible torque members are used. In addition this new improved broom may be operated in either direction relative to the direction of travel of the vehicular support, and the vehicular support may also be operated in either direction. Thus, with this newly improved apparatus it is possible to sweep in the same direction while the broom is driven back and forth over the same area, or, the direction of rotation of the broom can be alternated while the vehicular support is driven continuously in one direction. Therefore a certain definite area can be swept and re-swept by merely moving the vehicular support back and forth, without turning around to retrace the same path, and, the broom can be made to sweep or scatter material at will.

The objects of the invention are as follows:

First, to provide a traction broom with traction driving means including a selective transmission for driving the broom in either direction relative to the direction of travel of its vehicular support, and at different speeds relative to the speed of travel of the vehicular support.

Second; to provide a traction broom as outlined in which the broom frame is swivelly mounted to permit angular adjustment of the broom relative to the direction of travel, and in which the operative connection for driving the broom is carried through a swivel connection in axial alignment with the swivel connection between the broom frame and the vehicle frame to eliminate the necessity for extensible or sliding members.

In describing the invention reference will be made to the accompanying drawing, in which:

Fig. 1 is a top plane view of the invention.

Fig. 2 is a side elevation of Fig. 1.

Fig. 3 is a section taken on line 3—3 of Fig. 1.

Fig. 4 shows modifications of the operative swivel in the operative connection between the transmission and the broom, and;

Fig. 5 is an enlarged top plan view of the kingpin and its locking means.

The vehicular support is of substantially conventional design and includes the wheels 10, axle 11 and frame 12 which is sufficiently elevated to clear the broom 13 and dust guard 14 which are also of conventional design. A selective transmission 15 has an operative connection to the axle 11, the details of which are not shown as they are well known in related arts, the conventional shift lever 16 being provided for manual selection of the desired gear ratio or the direction of driving of the broom. A clutch 17 controls the transfer of power from the traction wheels and axle 11 to the transmission and is engageable and disengageable through the medium of the clutch lever 18. The transmission is suitably supported by the frame 12 as through a drop member 19.

Slidably and rotatably supported on top of the frame 12 is a broom upper frame consisting of front and rear members 20 and 21 and side members 22 and 23. This upper frame is pivoted to the vehicle frame at 24 by means of a kingpin 25 which operates through the cross-beam 26 which is a part of the upper frame, and through the kingpost formed between the members 27 and 28 which are a part of the frame 12. Thus this upper frame can be adjusted to various angular positions as indicated by the dotted positions, and the pivotal point or kingpin has its axis perpendicular to the axis of the broom.

Suitable means 30 is provided for changing the angularity of the frame, and locking means such as the arched member 31 which is integral with the vehicle frame 12 and provided with holes 32 for reception of a latch or pin 33, is provided for maintaining the angular adjustment of the upper frame.

The lower frame 34 is suspended from the upper frame 21, 22, 23 by drop members 35 which are fixedly attached to the member 21 and hingedly attached to the cross-beam 36 of the lower frame as indicated at 37, and by the connections 38 the opposite ends of which are respectively hingedly connected to the lower frame member 39 and bell-crank levers 40, the spring 41 increasing the pressure of the broom when the lever 42 is adjusted in one direction, adjustment of this lever in the other direction raising the broom from the surface 43, the member 44 being slidable within defined limits within the knuckles 38.

The driving means for the broom consists of an operative connection including an operative swivel in axial alignment with the axis of the kingpin, and is illustrated as consisting of a chain drive, shown guarded, and which transmits power from the transmission 15 to the shaft 45 as indicated at 46. The shaft 45 has its axis radial to the axis of the kingpin 25 and one member of a universal joint 47 is mounted on the end of this shaft with its universal axis central of the axis of the kingpin. This shaft 45 is mounted in bearings 48 which are supported on a bed plate 49 which is supported by the main members of the vehicle frame 12.

The other member of the universal joint is mounted on the end of the continuing shaft 50 which is suitably supported by bearings such as 51 and transmits its power through the operative connection 52 to the shaft 53 and thence through the operative connection 54 to the axle 55 of the broom. The bearing 51 is supported by the upper frame, and the axle is supported by the cross-beam 36. The bearing 51 therefore swings with the broom and broom frame. The shaft 53 is mounted in a bearing 56 which is mounted on the cross-beam.

Thus the selective transmission 15 permits operation of the broom at various speeds relative to the speed of travel of the vehicle and permits the broom to be driven in the same direction or in the opposite direction relative to the direction of travel of the vehicle. The location of the universal joint centrally of the axis of the kingpin eliminates the necessity for any sliding or extensible members in the operative connection, and location of the kingpin perpendicular to the axis of the broom provides for quick and easy angular adjustment of the broom and which is necessary each time the direction of travel of the vehicle is reversed.

In Fig. 4 is shown a modification of the swiveled portion of the drive and which is specifically adapted to either this arrangement or that described in the previously mentioned patent, and can also be used in connection with the arrangement illustrated in Fig. 1, the two systems being interchangeable. With this modification the operative connection from the transmission drives through the sprocket 58 which is mounted on the shaft 45 and which in turn is mounted in the bearings 48 which are supported by the vehicle frame 12 as by a hanger 59 which carries the kingpost through which the kingpin 61 passes and in which it is rotatable. This kingpin 61 is formed integral with and rises from the cross-beam 57 of the broom frame. A lever 62 is fixed on the upper end of the kingpin 61. If the universal joint is to be used, it is centered over the axis of this kingpin exactly as indicated in Figs. 1 and 3, the continuing shaft 50 continuing therefrom as indicated by the dotted figure in Fig. 4. When bevel gears are used to provide the swiveling action, the kingpin 61 and cross-beam 57 are bored and bushed to form a bearing, and instead of mounting one part of a universal joint on the end of the shaft 45, a bevel gear 63 is substituted and meshes with a gear 64 which is mounted at the upper end of the shaft 65 which is rotatable axially in the bushed bore of the kingpin and cross-beam. A second pair of bevel gears 66—67 is mounted on the lower end of the shaft 65 and on the end of the continuing shaft 50 which transmits the power to the broom through the operative connection 54, the shaft 50 being rotatably supported in the bearings 51 which are supported on the member 57.

Holes 68 are provided in the top face of the kingpost to receive a latch or pin 69 of the lever 62 and which locks the kingpin to the kingpost and prevents its rotation relative to the vehicle frame. The arrangement illustrated in Figs. 1, 2 and 3, is a modification of this principle, in which the lever 30 is attached to the upper frame instead of to the kingpin, and the holes are provided in the arched member 31 instead of in the kingpost. The type shown in Figs. 4 and 5 is best adapted to the broom illustrated in the previously mentioned patent.

I claim:

A main frame having front wheels and rear wheels; an auxiliary frame supported on said main frame and a vertical pivot connection centrally connecting said auxiliary frame to said main frame; a rush having an axle, and a brush frame supporting the opposite ends of said axle; a fixed hanger pivotally connecting said brush frame to said auxiliary frame, at one end, and an adjustable hanger including resilient depressive means and a bell crank lever connecting said brush frame at the other end to said auxiliary frame, and means for locking said bell crank lever in any one of several adjusted positions; a transmission having an operative connection to said rear wheels; a first shaft mounted in bearings on said auxiliary frame and including a universal joint having its universal axis centered in alignment with the axis of said pivot connection; drive means connecting said transmission to said first shaft; a second shaft mounted on said brush frame rearwardly of said brush; a driving connection between said first and said second shaft, and a driving connection between said second shaft and said axle for changing the relative speed of rotation of the brush; means for manually adjusting the transmission; means for adjusting said auxiliary frame and brush relative to the direction of travel of the main frame, and means for locking said auxiliary frame in any of its adjustable positions.

IRA M. WELLS.